Nov. 4, 1924.
E. F. SEVERTS
1,514,349
TRAP
Filed Aug. 26, 1922
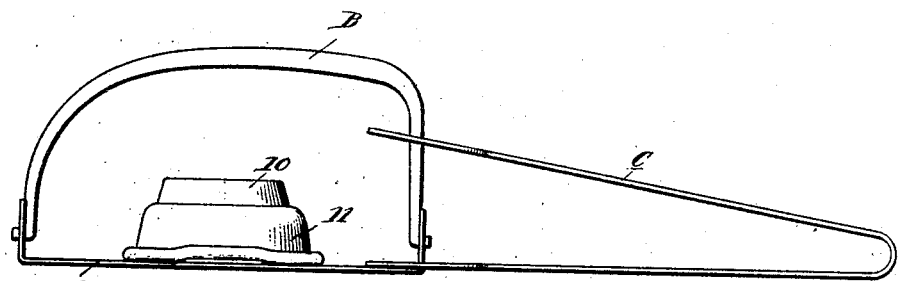
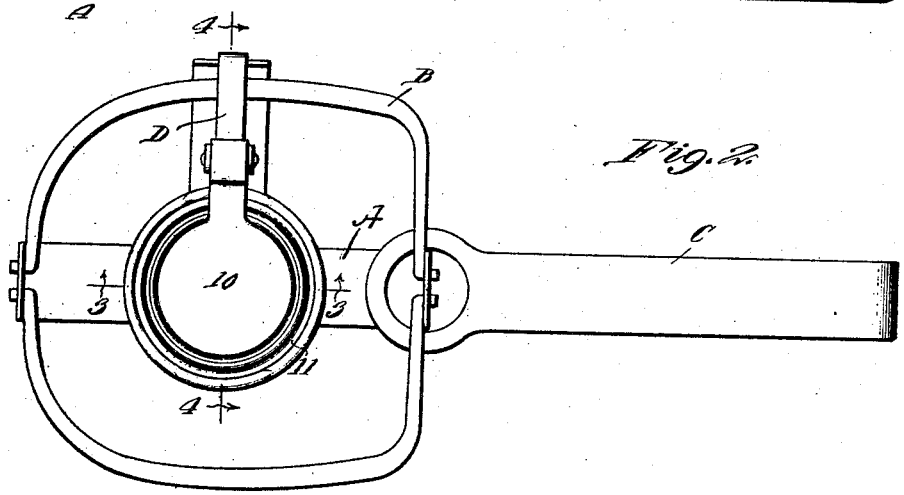
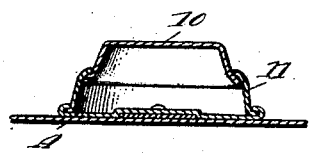
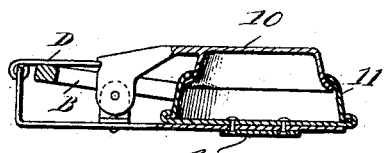
E. F. Severts
INVENTOR
BY Victor J. Evans
ATTORNEY
WITNESS:

Patented Nov. 4, 1924.

1,514,349

UNITED STATES PATENT OFFICE.

EDWIN F. SEVERTS, OF CLARKFIELD, MINNESOTA.

TRAP.

Application filed August 26, 1922. Serial No. 584,416.

*To all whom it may concern:*

Be it known that I, EDWIN F. SEVERTS, a citizen of the United States, residing at Clarkfield, in the county of Yellow Medicine and State of Minnesota, have invented new and useful Improvements in Traps, of which the following is a specification.

This invention relates to animal traps, particularly those of the jaw type, and has for its object the provision of a novel treadle structure or platform which is so constructed as to exclude snow, mud, fallen leaves, dirt and the like which might interfere with the proper action of the trap.

An important object is the provision of a spring trap in which the treadle or platform is surrounded by a guard flange which fits so snugly as to prevent any of the above mentioned foreign matter from passing below the treadle.

An additional object is the provision of a trap of this character which will be simple and inexpensive in manufacture, efficient and durable in use and a general improvement in the art.

With the above and other objects and advantages in view the invention consists in the details of construction to be hereinafter more fully described and claimed and illustrated in the accompanying drawings in which:

Figure 1 is a side elevation of a trap constructed in accordance with my invention showing it in released position, Figure 2 is a plan view showing it in set position and Figure 3 is a cross section on the line 3—3 of Figure 2. Figure 4 is a cross section on the line 4—4 of Figure 2.

Referring more particularly to the drawings I have shown a trap which includes the usual base A upon which are pivoted the usual curved jaws B urged into clamping relation by an ordinary spring C. The letter D designates the catch device which is released by pressure of a treadle.

In carrying out the present invention I provide a treadle 10 which is connected with the catch in the usual manner and which is of frusto-conical shape. Carried by the base A is an upstanding frusto-conical guard flange 11 which has the diameter of its upper opening less than the diameter of the lower end of the treadle so as to limit upward movement of the treadle when the trap is set. It is to be noted that there is consequently a very close fit between the treadle and the guard flange which will operate to exclude snow, mud, dirt and the like from entering below the treadle and interfering with the trap action.

From the foregoing description and a study of the drawings it is believed that the construction and operation will be clearly understood by one skilled in the art without any need for further elaboration. It is to be observed that the device will operate in the manner specified and will have the advantage set forth.

While I have shown and described the preferred embodiment of the invention it is of course to be understood that I reserve the right to make such changes in the form, construction and arrangement of parts as will not depart from the spirit of the invention or the scope of the subjoined claim.

Having thus described my invention I claim:

In a trap including a base, spring actuated jaws pivoted thereon, a spring for urging said jaws into clamping relation and a catch for holding the jaws separated, a releasing treadle operatively connected with the catch and of frusto-conical shaped with an outturned bottom flange, and a guard flange rising from the base and fitting snugly about the treadle, the guard flange being likewise of frusto-conical shape with an inturned flange and co-operating with the treadle to limit upward movement of the latter when the trap is set.

In testimony whereof I affix my signature.

EDWIN F. SEVERTS.